(12) United States Patent
Umeno

(10) Patent No.: US 10,364,760 B2
(45) Date of Patent: Jul. 30, 2019

(54) ENGINE CONTROL UNIT

(71) Applicant: DENSO CORPORATION, Kariya, Aichi-pref. (JP)

(72) Inventor: Masafumi Umeno, Kariya (JP)

(73) Assignee: DENSO CORPORATION, Kariya (JP)

(*) Notice: Subject to any disclaimer, the term of this patent is extended or adjusted under 35 U.S.C. 154(b) by 293 days.

(21) Appl. No.: 15/281,401

(22) Filed: Sep. 30, 2016

(65) Prior Publication Data
US 2017/0101944 A1 Apr. 13, 2017

(30) Foreign Application Priority Data
Oct. 7, 2015 (JP) .................. 2015-199704

(51) Int. Cl.
F02D 35/02 (2006.01)
G06F 17/18 (2006.01)
G01L 23/22 (2006.01)
G01M 15/12 (2006.01)
F02D 41/28 (2006.01)
F02P 5/152 (2006.01)

(52) U.S. Cl.
CPC ........... F02D 35/027 (2013.01); F02D 41/28 (2013.01); F02P 5/152 (2013.01); G01L 23/226 (2013.01); G01M 15/12 (2013.01); G06F 17/18 (2013.01); F02D 2041/286 (2013.01); F02D 2041/288 (2013.01); F02D 2200/025 (2013.01); Y02T 10/46 (2013.01)

(58) Field of Classification Search
CPC ........ F02D 35/027; F02D 41/28; F02P 5/152; G01L 23/226; G01M 15/12; G06F 17/18
See application file for complete search history.

(56) References Cited

U.S. PATENT DOCUMENTS 4,161,665 A * 7/1979 Buck ..................... G01L 23/223
310/26
4,290,301 A * 9/1981 Yamaguchi ............ G01H 11/02
73/35.09

(Continued)

FOREIGN PATENT DOCUMENTS

JP S61-098968 A 5/1986
JP 2012-103157 A 5/2012

Primary Examiner — Manuel A Rivera Vargas
Assistant Examiner — Yaritza H Perez Bermudez
(74) Attorney, Agent, or Firm — Posz Law Group, PLC

(57) ABSTRACT

An engine control unit includes an extracting portion acquiring a sound or vibration of an engine from external and extracting vibration components of frequency bands each of which including a resonant frequency of a vibration mode, a waveform synthesis portion synthesizing the vibration components extracted by the extracting portion to generate a synthesis vibration waveform, a calculation portion calculating a time average value by averaging the synthesis vibration waveform in a predetermined time, a peak detection portion detecting a peak strength of the vibration component of the frequency band including a lowest resonant frequency, a storage portion previously storing a first threshold and a second threshold, and a determination portion determining an existence of a knocking and whether a knock level is a first knock level or a second knock level, by comparing the time average value with the first threshold and comparing the peak strength with the second threshold.

12 Claims, 6 Drawing Sheets

(56) References Cited

U.S. PATENT DOCUMENTS

| | | | | |
|---|---|---|---|---|
| 4,409,816 | A * | 10/1983 | Yamaguchi | G01H 11/02 73/35.09 |
| 4,463,610 | A * | 8/1984 | Anderson, III | G01H 1/06 73/35.09 |
| 4,643,023 | A * | 2/1987 | Capps | G01M 15/12 73/114.07 |
| 4,777,920 | A * | 10/1988 | Oshiage | F02P 5/152 123/406.37 |
| 5,131,368 | A * | 7/1992 | Komurasaki | F02P 5/1526 123/406.16 |
| 5,269,178 | A * | 12/1993 | Vigmostad | B60G 17/019 73/114.15 |
| 5,373,448 | A * | 12/1994 | Katogi | G01L 23/225 123/435 |
| 6,246,952 | B1 * | 6/2001 | Honda | F02P 5/152 123/406.38 |
| 2002/0179053 | A1 * | 12/2002 | Kokubo | F02D 35/027 123/406.33 |
| 2008/0234918 | A1 * | 9/2008 | Kaneko | F02D 35/027 701/111 |
| 2008/0264150 | A1 * | 10/2008 | Oe | G01L 23/225 73/35.09 |
| 2009/0223281 | A1 * | 9/2009 | Masuda | G01L 23/225 73/35.09 |
| 2013/0151127 | A1 * | 6/2013 | Saito | F02D 41/222 701/111 |
| 2014/0041439 | A1 * | 2/2014 | Matsushima | G01L 23/221 73/35.09 |

* cited by examiner

ENGINE CONTROL UNIT

CROSS REFERENCE TO RELATED APPLICATION

This application is based on Japanese Patent Application No. 2015-199704 filed on Oct. 7, 2015, the disclosure of which is incorporated herein by reference.

TECHNICAL FIELD

The present disclosure relates to an engine control unit which can determine an existence of a knocking.

BACKGROUND

JP2012-103157A discloses a device determining an existence of a knocking.

SUMMARY

According to the device in JP2012-103157A, the existence of the knocking can be determined. However, the device cannot determine a knock level. Thus, it is difficult to optimize an ignition timing by using the above device.

It is an object of the present disclosure to provide an engine control unit which can determine an existence of a knocking and can further determine a knock level that is a level of the knocking.

An engine control unit includes an extracting portion acquiring a sound or vibration of an engine from external, the extracting portion extracting vibration components of a plurality of frequency bands, each of the frequency bands including a resonant frequency of a vibration mode among resonant frequencies of plural vibration modes, a waveform synthesis portion synthesizing the vibration components of the frequency bands extracted by the extracting portion to generate a synthesis vibration waveform, a calculation portion calculating a time average value by executing a time average operation to average the synthesis vibration waveform in a predetermined time, a peak detection portion detecting a peak strength of the vibration component of the frequency band including a lowest resonant frequency among the frequency bands extracted by the extracting portion, a storage portion previously storing a first threshold and a second threshold, and a determination portion determining an existence of a knocking and determining whether a knock level of the knocking is a first knock level or a second knock level that is higher than the first knock level, by executing a first comparison operation to compare the time average value with the first threshold and a second comparison operation to compare the peak strength with the second threshold.

The first knock level is between a knock level that the knocking does not exist and the second knock level. The vibration in the first knock level has the peak strength less than the peak strength of the vibration in the second knock level. A frequency of a generation of the vibration in the first knock level is larger than that of the vibration in the second knock level, and a strength of the vibration in the first knock level is more likely to vary than that of the vibration in the second knock level.

The extracting portion extracts the vibration components of the frequency bands, each of the frequency bands including the resonant frequency of the vibration mode among the resonant frequencies of the vibration modes. The waveform synthesis portion synthesizes the vibration components of the frequency bands extracted by the extracting portion to generate the synthesis vibration waveform. Thus, it is more readily determined that the knock level is the first knock level or the knocking does not exist. Further, the calculation portion calculates the time average value by executing the time average operation to average the synthesis vibration waveform in the predetermined time. Thus, a variation of the strength of the vibration in the first knock level can be reduced. Then, it can be determined that the knocking does not exist or the knock level is at least the first knock level, by comparing the time average value with the first threshold.

The peak detection portion detects the peak strength of the vibration component of the frequency band including the lowest resonant frequency among the frequency bands extracted by the extracting portion. Generally, the peak strength increases in accordance with a decrease in resonant frequency. Then, it can be determined that the knock level is the second knock level or the knock level is lower than or equal to the first knock level, by comparing the peak strength with the second threshold.

According to the present disclosure, the existence of the knocking and the knock level can be determined. Specifically, it can be determined that the knocking does not exist, the knock level is the first knock level, or the knock level is the second knock level. Thus, an ignition timing can be optimized.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Figure 1:
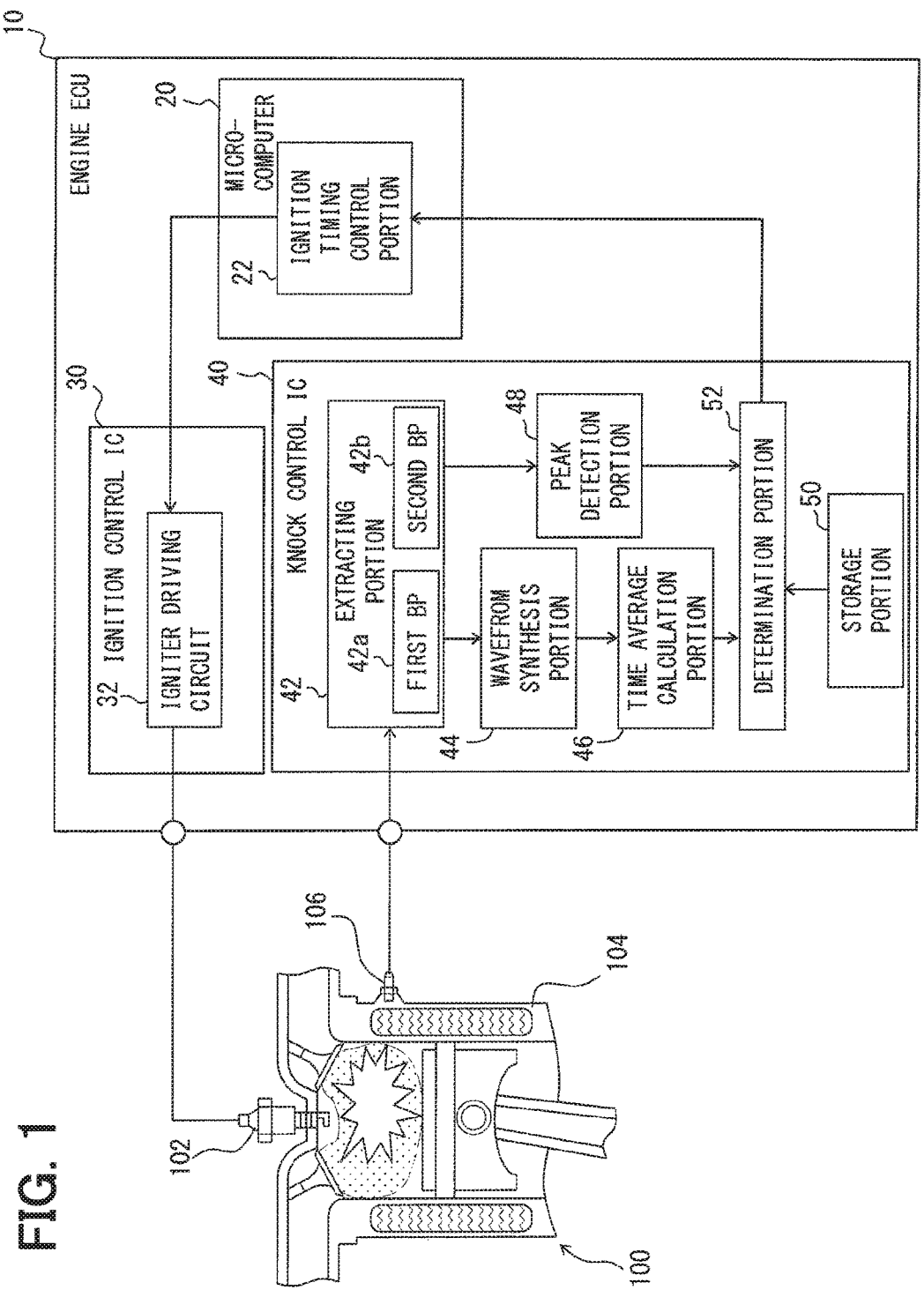
FIG. 1 is a schematic diagram showing an engine control unit according to a first embodiment of the present disclosure.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereafter, referring to drawings, embodiments of the present disclosure will be described. The substantially same parts or components as those in the embodiments are indicated with the same reference numerals and the same descriptions may be omitted.

First Embodiment

Referring to FIG. 1, a configuration of an engine control unit according to a first embodiment of the present disclosure will be described. Hereafter, the engine control unit is an engine ECU (engine electronic control unit) 10.

As shown in FIG. 1, the engine ECU 10 is arranged in an engine room of a vehicle. The engine ECU 10 controls a driving of an engine 100. The engine ECU 10 includes a microcomputer 20, an ignition control IC (ignition control integrated circuit) 30, and a knock control IC (knock control integrated circuit) 40.

The microcomputer 20 includes a CPU, a ROM, a RAM, a register, and an I/O port. In the microcomputer 20, the CPU uses a temporary storing function of the RAM and the register, and executes a signal operation according to various data acquired through a bus by using a control program that is previously stored in the ROM. The CPU outputs a signal obtained by executing the signal operation to the bus. As the above description, the microcomputer 20 executes various functions.

The microcomputer 20 calculates a target torque that is a torque requested to be outputted by the engine 100. The microcomputer 20 controls a throttle valve that is not shown to open at a proper degree and controls a fuel injection quantity of the engine 100 and an ignition timing of the engine 100, so as to control the engine 100 to generate the target torque. Thus, the microcomputer 20 further includes an ignition timing control portion 22.

The ignition timing control portion 22 determines a cylinder that is requested to be ignited, based on a signal of a cam angle sensor that is not shown. The ignition timing control portion 22 acquires signals of a crank angle sensor, an air flow sensor, and a water temperature sensor which are not shown. The ignition timing control portion 22 calculates an engine rotation number, an engine load, and a water temperature correction. Then, the ignition timing control portion 22 calculates a basic ignition timing based on a calculation result including the engine rotation number, the engine load, and the water temperature correction. The basic ignition timing is a MBT (minimum advance for the best torque) that is an ignition timing that the torque of the engine 100 becomes maximum.

The ignition timing control portion 22 acquires a determination result from the knock control IC 40, and calculates a final ignition timing based on the determination result and the basic ignition timing. The ignition timing control portion 22 acquires a battery voltage that is a voltage of a battery that is not shown, and calculates an energization period of an ignition coil based on the engine rotation number and the battery voltage. The ignition timing control portion 22 outputs the final ignition timing and the energization period to the ignition control IC 30 as an ignition instruction signal.

The ignition control IC 30 generates an igniter controlling signal controlling a driving of an igniter 102 of the cylinder, based on the ignition instruction signal outputted by the ignition timing control portion 22 of the microcomputer 20. The ignition control IC 30 includes an igniter driving circuit 32 outputting the igniter controlling signal. An ignition system including the igniter 102 further includes the ignition coil including a primary coil and a secondary coil, and an ignition plug connected with the secondary coil. The igniter 102 controls an energization of the primary coil of the ignition coil. In other words, the igniter 102 controls to turn on and turn off the primary coil.

The igniter 102 includes a switching element such as an IGBT (insulated gate bipolar transistor). The igniter 102 turns on and turns off the switching element according to a signal from the igniter driving circuit 32, so as to control to energize and deenergize the primary coil. Specifically, the igniter 102 turns on the switching element to start to energize the primary coil, and then the igniter 102 turn off the switching element to deenergize the primary coil until the energization period has elapsed. Then, a voltage of the secondary coil is raised while the primary coil is deenergized, and an electric discharge occurs at the ignition plug.

An engine block 104 is provided with a knock sensor 106 detecting a knocking vibration of the engine 100, the crank angle sensor, and the water temperature sensor. The knock sensor 106 detects a vibration of the engine block 104.

The knock control IC 40 acquires an output signal of the knock sensor 106, and determines an existence of a knocking and determines a knock level of when the knocking exists. The knocking that is a knock is a phenomenon that a pressure wave reciprocates in the cylinder to make the cylinder resonates with the pressure wave. In this case, the pressure wave is generated by a rapid combustion that a non-combustion gas in the cylinder of the engine 100 is compressed by a combustion gas and is self-ignited.

The knock control IC 40 includes an extracting portion 42, a waveform synthesis portion 44, a time average calculation portion 46, a peak detection portion 48, a storage portion 50, and a determination portion 52. The time average calculation portion 46 is equivalent to a calculation portion.

The extracting portion 42 extracts vibration components of plural frequency bands, each of which includes a resonant frequency of a vibration mode among resonant frequencies of plural vibration modes. According to the present embodiment, a digital signal is inputted to the extracting portion 42 through an A-D converter that is not shown. The extracting portion 42, for example, includes a first band-pass filter (first BP) 42a and a second band-pass filter (second BP) 42b, and extracts vibration components of two frequency bands. The first band-pass filter 42a extracts a vibration component of a frequency band including a primary resonant frequency of when the vibration mode is a (1, 0) mode. The second band-pass filter 42b extracts a vibration component of a frequency band including the primary resonant frequency of when the vibration mode is a (2, 0) mode. The first band-pass filter 42a and the second band-pass filter 42b are equivalent to plural band-pass filters.

The frequency bands extracted by the first band-pass filter 42a and the second band-pass filter 42b is set to include the primary resonant frequency that is established based on a formula (1) recommended by Draper.

$$f = \rho_{m,n} \times c / (\pi \times B) \tag{1}$$

In the formula (1), f represents the resonant frequency, $\rho_{m,n}$ represents a vibration mode constant, c represents a sound velocity, and B represents a cylinder bore diameter that is a diameter of a cylinder bore of the engine 100.

The vibration mode constant $\rho_{m,n}$ is a root of a Bessel function.

Figure 2:
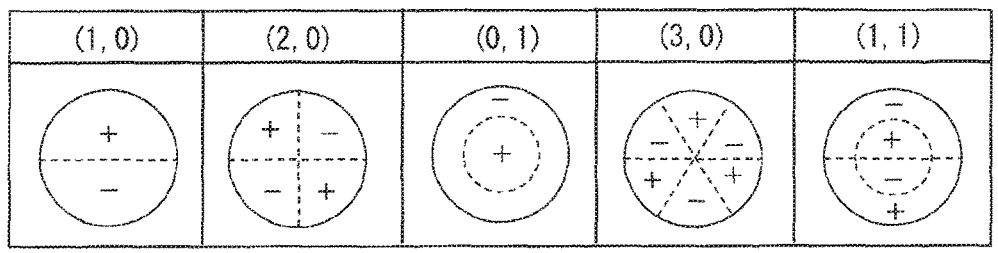
FIG. 2 is a graph showing a vibration mode.

As shown in FIG. 2, a resonant vibration of the pressure wave in the cylinder which is generated in a combustion is the knocking vibration, and includes plural vibration modes. As shown in FIG. 2, in each of (m, n) modes, a dashed line indicates nodes of the resonant vibration, and areas with symbols "+" and "−" indicate vibration phases which are relatively stages in locations that are not nodes.

Regarding primary resonant frequencies of five (m, n) modes including the (1, 0) mode, a (2, 0) mode, a (0, 1) mode, a (3, 0) mode, and a (1, 1) mode as shown in FIG. 2, the primary resonant frequency of the (1, 0) mode is the lowest of the (m, n) modes, and the primary resonant frequency of the (1, 1) mode is the highest of the (m, n) modes. Further, the primary resonant frequency of the (2, 0) mode is higher than the primary resonant frequency of the (1, 0) mode, the primary resonant frequency of the (0, 1) mode is higher than the primary resonant frequency of the (2, 0) mode, the primary resonant frequency of the (3, 0) mode is higher than the primary resonant frequency of the (0, 1) mode, the primary resonant frequency of the (1, 1) mode is higher than the primary resonant frequency of the (3, 0) mode.

According to the present embodiment, the first band-pass filter 42a is set to extract the vibration component of a first predetermined frequency band including the primary resonant frequency of when the vibration mode is the (1, 0) mode, so as to extract the vibration component of the primary resonant frequency of when the vibration mode is the (1, 0) mode. For example, the first band-pass filter 42a is set to extract the vibration component of 7 kHz to 8 kHz. Further, the second band-pass filter 42b is set to extract the vibration component of a second predetermined frequency band including the primary resonant frequency of when the vibration mode is the (2, 0) mode, so as to extract the vibration component of the primary resonant frequency of when the vibration mode is the (2, 0) mode. For example, the second band-pass filter 42b is set to extract the vibration component of 8 kHz to 12 kHz. As the above description, the extracting portion 42 extracts two modes among the five vibration modes which are the (m, n) modes of the knocking.

The waveform synthesis portion 44 synthesizes the vibration component of the frequency band extracted by the first band-pass filter 42a and the vibration component of the frequency band extracted by the second band-pass filter 42b, to generate a synthesis vibration waveform. The synthesis vibration waveform includes the vibration component of the primary resonant frequency of when the vibration mode is the (1, 0) mode and the vibration component of the primary resonant frequency of when the vibration mode is the (2, 0) mode.

The time average calculation portion 46 executes a time average operation to average the synthesis vibration waveform in a predetermined time, so as to calculate a time average value. The time average value is calculated based on a formula (2). In the formula (2), I represents a strength, and b represents a data number of obtaining the strength. The time average calculation portion 46 integrates the strength I by a power value a (a is greater than or equal to 1) to obtain an integrated value, and then divides the integrated value by the data number b of obtaining the strength I in the predetermined time, so as to obtain the time average value.

$$\text{Time average value} = \{(\Sigma I^a)/b\}^{1/a} \quad (2)$$

Figure 3:
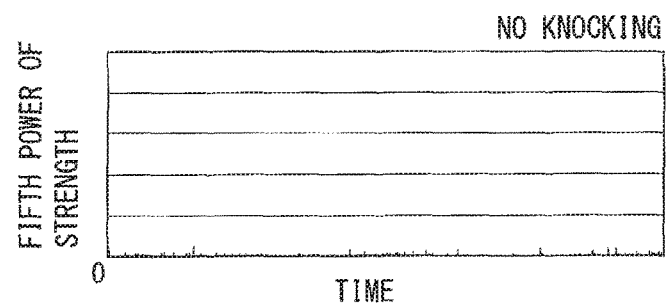
FIG. 3 is a graph showing a waveform in a case where a knocking does not exist.
Figure 4:
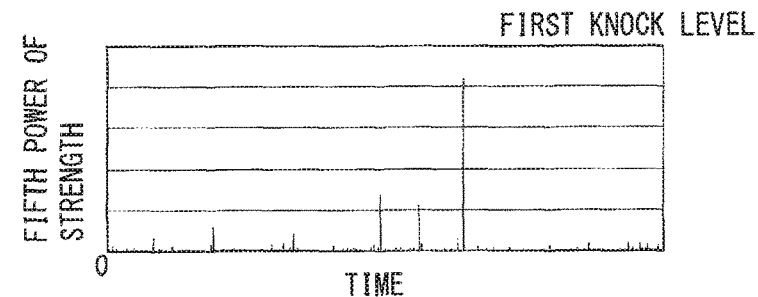
FIG. 4 is a graph showing a waveform of a vibration in a first knock level.

According to the present embodiment, as an example, the time average calculation portion 46 integrates the strength I by five to obtain the integrated value that is the fifth power of the strength I, and then divides the integrated value by the data number b, so as to obtain the time average value. FIGS. 3 and 4 show the same frequency band of when the strength I of the vibration component is integrated by five. FIG. 3 shows the frequency band that the knocking does not exist, and FIG. 4 shows the frequency band that the vibration component is in a first knock level. As shown in FIGS. 3 and 4, vertical axes indicate the fifth powers of the strengths I, and horizontal axes indicate time. As shown in FIGS. 3 and 4, when the strength I is integrated by the power value a (a is greater than or equal to 2), a determination of the existence of the knocking and a determination of the first knock level are more readily obtained.

Figure 5:
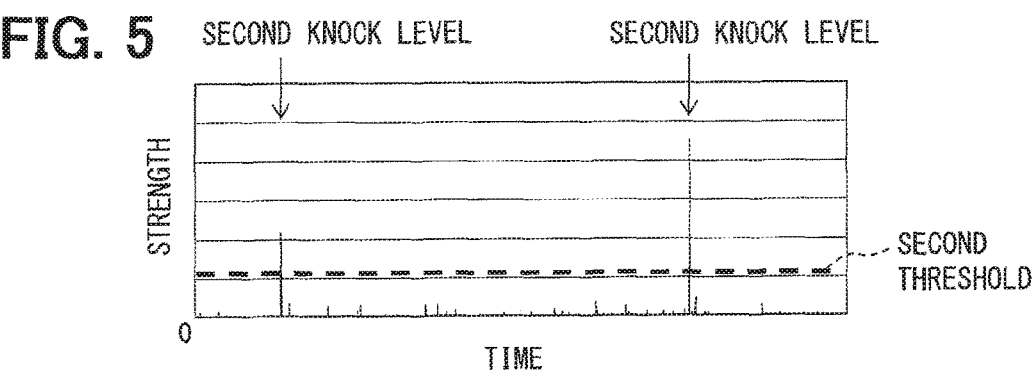
FIG. 5 is a graph showing a determination of the first knock level and a second knock level.

The peak detection portion 48 detects a peak strength relative to the vibration component of the frequency band including a lowest resonant frequency among plural frequency bands extracted by the extracting portion 42. According to the present embodiment, the primary resonant frequency of when the vibration mode is the (1, 0) mode is the lowest resonant frequency. Thus, the peak detection portion 48 detects the peak strength relative to the vibration component of the frequency band including the primary resonant frequency of when the vibration mode is the (1, 0) mode. As shown in FIG. 5, since the peak strength of the vibration that is less than or equal to the first knock level differs from the peak strength of the vibration that is equal to a second knock level, the vibration that is less than or equal to the first knock level and the vibration that is equal to the second knock level can be determined according to the peak strength. As shown in FIG. 5, vibrations, the peak strengths of which are greater than or equal to a second threshold, indicate the vibrations are equal to the second knock level, and other vibrations indicate the vibrations, the peak strengths of which are less than or equal to the first knock level. As shown in FIG. 5, a vertical axis indicates the strength, and a horizontal axis indicates time.

The storage portion 50 stores a threshold used by the determination portion 52 in the knock determination operation. The storage portion 50 can be a memory that data is maintained when the engine ECU 10 is deenergized. The threshold is stored in the storage portion 50 when the engine ECU 10 is manufactured. The storage portion 50 stores the threshold including a first threshold that is used in a first comparison operation executed by the determination portion 52 and a second threshold that is used in a second comparison operation executed by the determination portion 52. The first threshold is a comparison subject of the time average value. The second threshold is a comparison subject of the peak strength.

The determination portion 52 executes the first comparison operation to compare the time average value with the first threshold and executes the second comparison operation to compare the peak strength with the second threshold. According to the first comparison operation and the second comparison operation, the determination portion 52 determines the existence of the knocking and determines whether the knock level that is a level of the vibration of the knocking is the first knock level or the second knock level that is higher than the first knock level.

Figure 6:
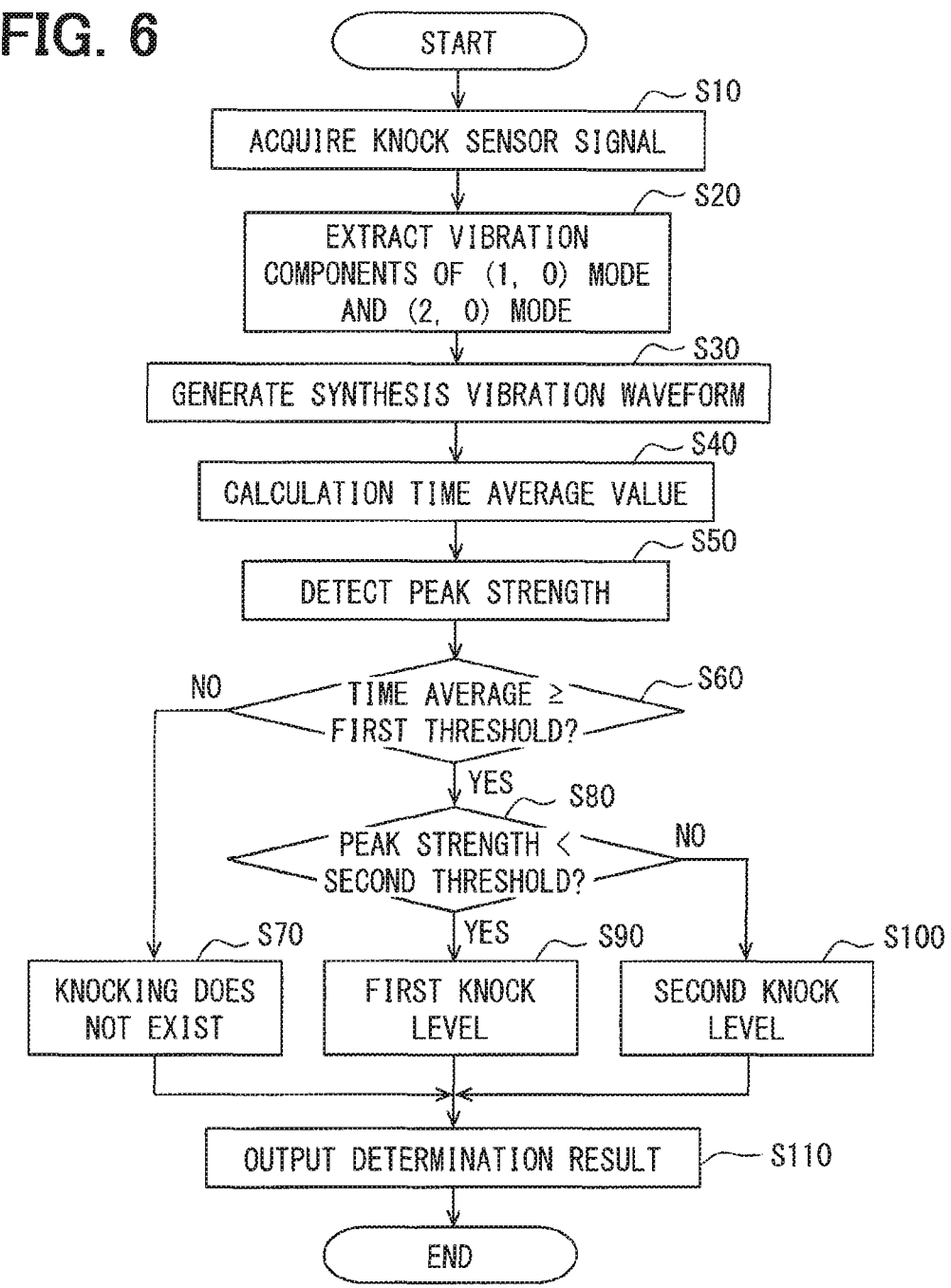
FIG. 6 is a flowchart showing a knock determination operation.

Referring to FIG. 6, the knock determination operation executed by the knock control IC 40 will be described. The knock control IC 40 repeatedly executes the knock determination operation at a predetermined period in a driving timing that is a drive of the engine 100.

As shown in FIG. 6, at S10, the knock control IC 40 acquires the output signal of the knock sensor 106, and then converts the output signal to a digital signal by an A-D conversion. According to the present embodiment, the output signal of the knock sensor 106 is referred to as a knock sensor signal.

At S20, the extracting portion 42 extracts the vibration component of the frequency band including the primary resonant frequency of when the vibration mode is the (1, 0) mode and extracts the vibration component of the frequency band including the primary resonant frequency of when the vibration mode is the (2, 0) mode. The extracting portion 42 extracts the vibration component of the frequency band including the primary resonant frequency of when the vibration mode is the (1, 0) mode, by using the first band-pass filter 42a. The extracting portion 42 extracts the vibration component of the frequency band including the primary resonant frequency of when the vibration mode is the (2, 0) mode, by using the second band-pass filter 42b.

At S30, the waveform synthesis portion 44 synthesizes the vibration components of the frequency bands extracted by the extracting portion 42, to generate the synthesis vibration waveform. According to the present embodiment, the waveform synthesis portion 44 synthesizes the vibration component of the frequency band including the primary resonant frequency of when the vibration mode is the (1, 0) mode and the vibration component of the frequency band including the primary resonant frequency of when the vibration mode is the (2, 0) mode.

At S40, the time average calculation portion 46 executes the time average operation to average the synthesis vibration waveform in a predetermined time, so as to calculate the time average value. According to the present embodiment, the time average calculation portion 46 calculates the time average value based on the formula (2). Specifically, the time average calculation portion 46 obtains the time average value by calculating the fifth power of the strength I.

At S50, the peak detection portion 48 detects the peak strength of the vibration component of the frequency band including the lowest resonant frequency. In this case, the frequency band including the lowest resonant frequency is a frequency band among the frequency bands extracted by the extracting portion 42. According to the present embodiment, the primary resonant frequency of when the vibration mode is the (1, 0) mode is the lowest resonant frequency. Thus, the peak detection portion 48 detects the peak strength relative to the vibration component of the frequency band including the primary resonant frequency of when the vibration mode is the (1, 0) mode.

At S60, the determination portion 52 compares the first threshold previously stored in the storage portion 50 with the time average value calculated at S40. In other words, the determination portion 52 executes the first comparison operation. When the determination portion 52 determines that the time average value is less than the first threshold at S60, the determination portion 52 proceeds to S70. At S70, the determination portion 52 determines that the knocking does not exist.

When the determination portion 52 determines that the time average value is greater than or equal to the first threshold at S60, the determination portion 52 determines that the knock level is at least the first knock level and proceeds to S80. At S80, the determination portion 52 compares the second threshold previously stored in the storage portion 50 with the peak strength detected at S50. In other words, the determination portion 52 executes the second comparison operation. When the determination portion 52 determines that the peak strength is less than the second threshold at S80, the determination portion 52 proceeds to S90. At S90, the determination portion 52 determines that the knock level of the knocking is the first knock level. When the determination portion 52 determines that the peak strength is greater than or equal to the second threshold at S80, the determination portion 52 proceeds to S100. At S100, the determination portion 52 determines that the knock level of the knocking is the second knock level.

The first knock level is a level of a slight vibration that a damage does not occur to the engine 100. According to the present embodiment, the first knock level is also a slight knock level, a small knock level, a low knock level, or a weak knock level. The vibration in the first knock level is slightly hearable to an auditory sensation specialist. The vibration in the second knock level has a strength greater than that of the vibration in the first knock level. A frequency of a generation of the vibration in the second knock level is lower than a frequency of a generation of the vibration in the first knock level. The peak strength of the vibration in the second knock level is remarkably greater than the peak strength of the vibration in the first knock level.

After S70, S90, or S100, at S110, the determination portion 52 outputs the determination result to the ignition timing control portion 22 of the microcomputer 20. Then, the present knock determination operation is completed.

When the ignition timing control portion 22 receives the determination result from the knock control IC 40, the ignition timing control portion 22 calculates the final ignition timing, based on the determination result and the basic ignition timing. Specifically, the ignition timing control portion 22 may determine whether a present ignition timing is retarded relative to the basic ignition timing (MBT). When the ignition timing control portion 22 determines that the present ignition timing is not retarded relative to the basic ignition timing, the ignition timing control portion 22 uses the basic ignition timing as the ignition timing.

When the ignition timing control portion 22 determines that the present ignition timing is retarded relative to the basic ignition timing, the ignition timing control portion 22 executes different operations according to the determination result. When the ignition timing control portion 22 receives the determination result indicating that the knocking does not exist, the ignition timing control portion 22 advances the ignition timing by a predetermined value. When the ignition timing control portion 22 receives the determination result indicating that the knock level is the first knock level, the ignition timing control portion 22 maintains the ignition timing to be the present ignition timing. When the ignition timing control portion 22 receives the determination result indicating that the knock level is the second knock level, the ignition timing control portion 22 retards the ignition timing by a predetermined value.

Next, effects of the engine control unit 10 according to the present embodiment will be described.

As the above description, the knocking that is the resonant vibration of the pressure wave in the cylinder generated in the combustion has plural vibration modes. According to the present embodiment, the extracting portion 42 extracts the vibration components of two frequency bands including the resonant frequencies in two vibration modes, respectively. The waveform synthesis portion 44 synthesizes a waveform based on the vibration components of the frequency bands which are extracted. Thus, the vibration of the first knock level that is extracted can be increased, and an unnecessary noise can be removed by individually setting the frequency bands. In other words, comparing with a configuration that a vibration component of one frequency band is extracted, a configuration that two vibration components are extracted can lead to a result that it is more readily determined that the knock level is the first knock level or the knocking does not exist.

The time average calculation portion 46 calculates the time average value by executing the time average operation to average the synthesis vibration waveform. Thus, a variation of a strength of the vibration in the first knock level can be reduced. Then, it can be determined that the knocking does not exist or the knock level is at least the first knock level, by comparing the time average value with the first threshold.

The peak detection portion 48 detects the peak strength of the vibration component of the frequency band including the lowest resonant frequency among the two frequency bands which are extracted. Generally, the peak strength increases in accordance with a decrease in resonant frequency. Then, it can be determined that the knock level is the second knock level or the knock level is lower than or equal to the first knock level, by comparing the peak strength with the second threshold.

According to the present embodiment, the existence of the knocking and the knock level can be determined. Specifically, it can be determined that the knocking does not exist, the knock level is the first knock level, or the knock level is the second knock level. Thus, the ignition timing can be optimized.

According to the present embodiment, the time average calculation portion 46 calculates the time average value by integrating the strength I by the power value a (a is greater than or equal to 2). Comparing with a configuration that the power value a is one, a configuration that the power value a is greater than one can lead to a result that it is more readily determined that the knocking does exist or the knock level is the first knock level.

According to the present embodiment, the determination portion 52 firstly executes the first comparison operation. When the determination portion 52 determines that the knocking exists in the first comparison operation, the determination portion 52 then executes the second comparison operation. Thus, a determination timing that the knocking does not exist can be advanced. When the basic ignition timing (MBT) is used as the ignition timing, an operation time using the basic ignition timing as the ignition timing can be shortened.

According to the present embodiment, the first band-pass filter 42a is set to extract the vibration component of the first predetermined frequency band including the primary resonant frequency of when the vibration mode is the (1, 0) mode, so as to extract the vibration component of the primary resonant frequency of when the vibration mode is the (1, 0) mode. Further, the second band-pass filter 42b is set to extract the vibration component of the second predetermined frequency band including the primary resonant frequency of when the vibration mode is the (2, 0) mode, so as to extract the vibration component of the primary resonant frequency of when the vibration mode is the (2, 0) mode. The frequency band of a band pass is previously set to include the primary resonant frequency that is determined by the formula (1). Then, the vibration of the knocking can be accurately detected without being affected by an external environment.

According to the present embodiment, the primary resonant frequencies of when the vibration modes are the (1, 0) mode and the (2, 0) mode have the peak strengths that are high, among the vibration modes. Thus, an accuracy of a detection of the vibration of the knocking and an accuracy of a detection of the vibration of the first knock level can be improved.

Second Embodiment

A second embodiment of the present disclosure can be referred to the first embodiment. Therefore, a description of the engine control unit 10 that is common in the first embodiment and the second embodiment will be omitted.

According to the first embodiment, the determination portion 52 firstly executes the first comparison operation. When the determination portion 52 determines that the knocking exists in the first comparison operation, the determination portion 52 then executes the second comparison operation. According to the present embodiment, the determination portion 52 firstly executes the second comparison operation. When the determination portion 52 determines that the peak strength is less than the second threshold, the determination portion 52 then executes the first comparison operation.

Figure 7:
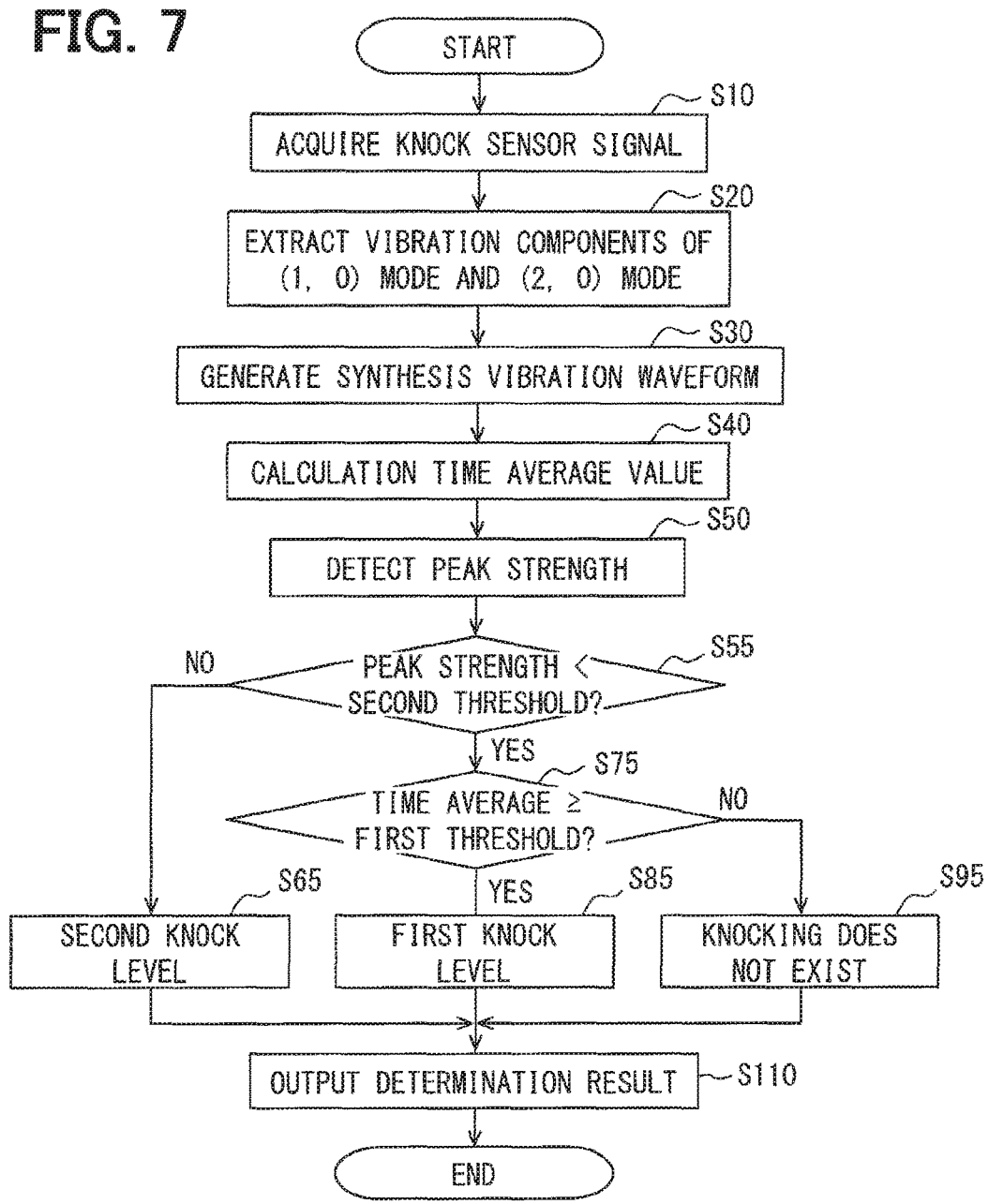
FIG. 7 is a flowchart showing the knock determination operation according to a second embodiment of the present disclosure.

As shown in FIG. 7, in the knock determination operation, S10 to S50 are the same as those in the knock determination operation according to the first embodiment. At S55, the determination portion 52 compares the second threshold previously stored in the storage portion 50 with the peak strength detected at S50. In other words, the determination portion 52 executes the second comparison operation. When the determination portion 52 determines that the peak strength is greater than or equal to the second threshold at S55, the determination portion 52 proceeds to S65. At S65, the determination portion 52 determines that the knock level of the knocking is the second knock level.

When the determination portion 52 determines that the peak strength is less than the second threshold at S55, the determination portion 52 proceeds to S75. At S75, the determination portion 52 compares the first threshold previously stored in the storage portion 50 with the time average value calculated at S40. In other words, the determination portion 52 executes the first comparison operation. When the determination portion 52 determines that the time average value is greater than or equal to the first threshold at S75, the determination portion 52 proceeds to S85. At S85, the determination portion 52 determines that the knock level is the first knock level. When the determination portion 52 determines that the time average value is less than the first threshold at S75, the determination portion 52 proceeds to S95. At S95, the determination portion 52 determines that the knocking does not exist. After S65, S85, or S95, at S110, the determination portion 52 outputs the determination result to the ignition timing control portion 22 of the microcomputer 20. Then, the present knock determination operation is completed.

According to the present embodiment, a determination timing of the second knock level can be advanced. Thus, an operation retarding the ignition timing can be advanced.

Third Embodiment

A third embodiment of the present disclosure can be referred to the first embodiment and the second embodiment. Therefore, a description of the engine control unit 10 that is common in the first embodiment, the second embodiment, and the third embodiment will be omitted.

According to the first embodiment, the extracting portion 42 includes the first band-pass filter 42a and the second band-pass filter 42b through which the frequency band of the band pass is previously set to include the primary resonant frequency that is determined by the formula (1). Further, the first band-pass filter 42a and the second band-pass filter 42b extract the vibration component of the first predetermined frequency band including the primary resonant frequency of when the vibration mode is the (1, 0) mode and the vibration component of the second predetermined frequency band including the primary resonant frequency of when the vibration mode is the (2, 0) mode, respectively.

Figure 8:
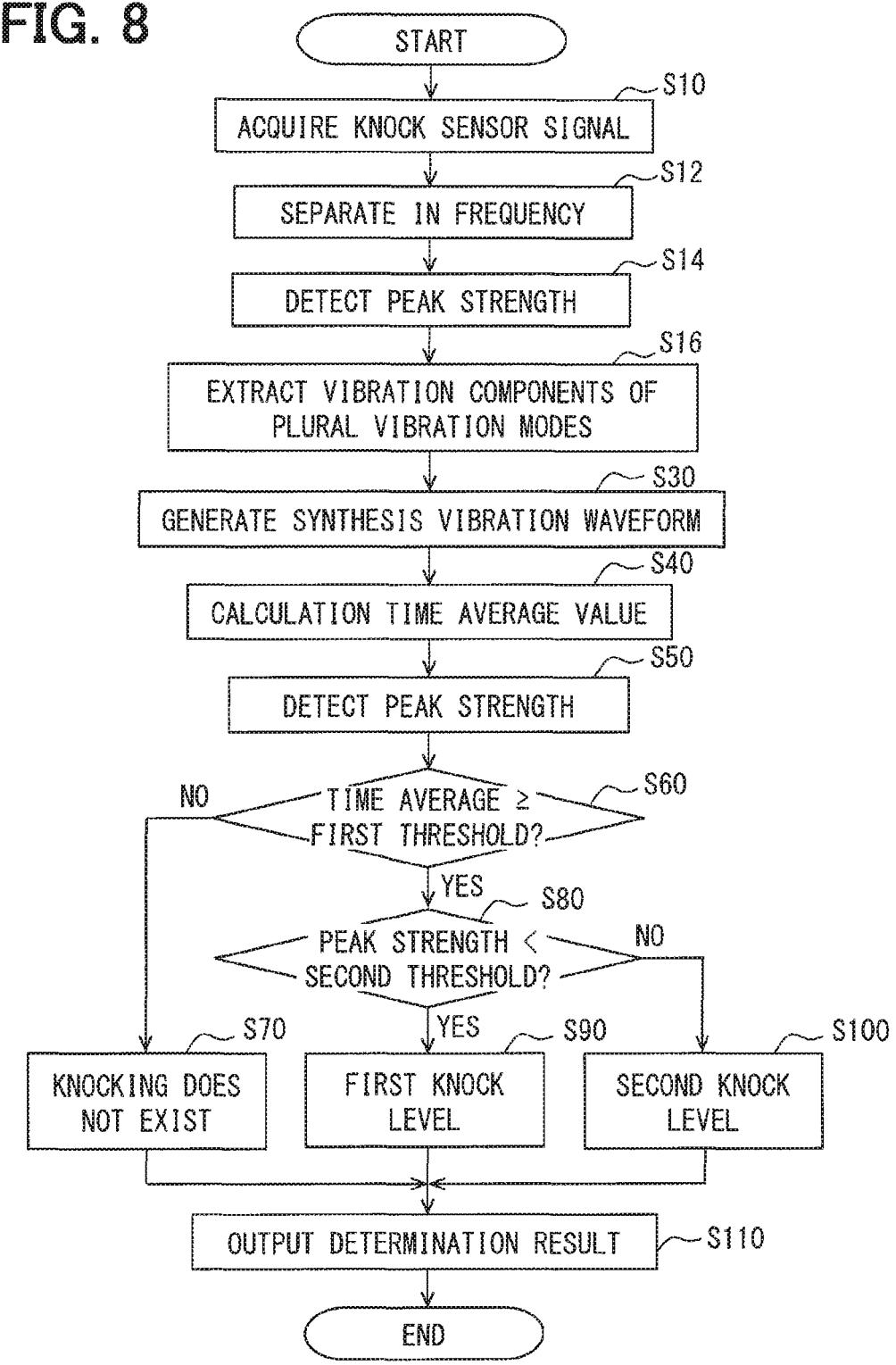
FIG. 8 is a flowchart showing the knock determination operation according to a third embodiment of the present disclosure.
Figure 9:
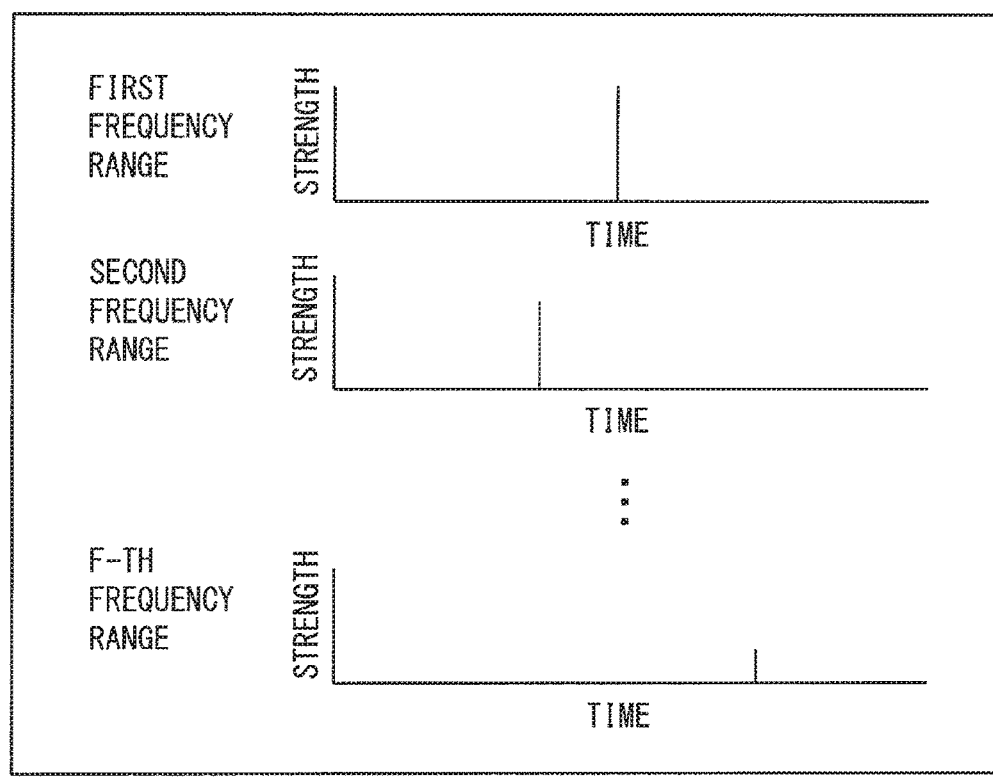
FIG. 9 is a graph showing a frequency separation.

According to the present embodiment, as shown in FIG. 8, after S10, at S12, the extracting portion 42 separates the output signal of the knock sensor 106 in frequency. As shown in FIG. 9, the extracting portion 42 may separate the output signal per specific frequency. In this case, the specific frequency is 5 kHz. As shown in FIG. 9, the output signal is separated to frequency ranges including a first frequency range, a second frequency range, . . . , and an f-th frequency range. As shown in FIG. 9, a vertical axis indicates the strength, and a horizontal axis indicates time.

At S14, the extracting portion 42 detects the peak strengths relative to the frequency ranges which are separated. At S16, the extracting portion 42 selects plural frequency ranges which include peak strengths that are high from all the frequency ranges which are separated, and extracts the vibration components of the frequency bands including the resonant frequencies in the vibration modes, respectively. For example, the extracting portion 42 may select the frequency range including a highest peak strength and the frequency range including a second highest peak strength. Thus, the frequency range including the primary resonant frequency of when the vibration mode is the (1, 0) mode and the frequency are including the primary resonant frequency of when the vibration mode is the (2, 0) mode are selected.

As shown in FIG. 8, in the knock determination operation, S30 to S110 are the same as those in the knock determination operation according to the first embodiment. Alternatively, in the knock determination operation according to the present embodiment, operations of S30 to S110 according to the second embodiment may be used after S16. Thus, in the present embodiment, effects in the first embodiment and the second embodiment can be achieved.

The present disclosure is not limited to the above embodiments. The present disclosure is intended to cover various modification and equivalent arrangements obtained by a person skilled in the art of the present disclosure. The present disclosure is not limited to combinations of components in the above embodiments. The present disclosure is enable in various combinations. The scope of the present disclosure is not limited to the above embodiment. Several technical scope disclosed are indicated by the following claims, it should be understood as further to include all modifications within the meaning and scope of the description and equivalent scope of the claims.

According to the above embodiment, the extracting portion 42, the waveform synthesis portion 44, the time average calculation portion 46, the peak detection portion 48, the storage portion 50, and the determination portion 52 are parts of the knock control IC 40. However, the above portions are not limited to the knock control IC 40. At least one of the extracting portion 42, the waveform synthesis portion 44, the time average calculation portion 46, the peak detection portion 48, the storage portion 50, or the determination portion 52, can be provided or achieved by a computer that executes a software stored in a memory that is substantial, a software, a hardware, or a combination of the above. When at least one of the above portions is constituted by an electric circuit that is a hardware, at least one of the above portions can be constituted by at least one of a digital circuit or an analog circuit.

According to the present embodiment, the knock sensor 106 detecting the knocking vibration of the engine 100 is used to detect the knocking. However, a sensor detecting a sound of the engine 100 can be used instead of the knock sensor 106.

The vibration modes extracted by the extracting portion 42 are not limited to the (1, 0) mode and the (2, 0) mode. For example, the (2, 0) mode and the (0, 1) mode may be extracted by the extracting portion 42. Further, the vibration modes extracted by the extracting portion 42 are not limited to two vibration modes, and may be three or more vibration modes.

According to the above embodiments, the time average calculation portion 46 calculates the time average value by integrating the strength I by five (the power value a is 5). However, the power value a is not limited to 5. The power value a may be any values greater than or equal to 1. For example, the power value a may be 2.

What is claimed is:

1. An engine control unit comprising:
   at least one memory; and
   at least one microcomputer coupled to the at least one memory and configured to
   acquire a sound or vibration of an engine from external, the at least one microcomputer extracts vibration components of a plurality of frequency bands, each of the frequency bands including a resonant frequency of a vibration mode among resonant frequencies of plural vibration modes;
   synthesize the vibration components of the frequency bands which are extracted to generate a synthesis vibration waveform;
   calculate a time average value by executing a time average operation to average the synthesis vibration waveform in a predetermined time;
   detect a peak strength of the vibration component of the frequency band including a lowest resonant frequency, wherein the frequency band including the lowest resonant frequency is a frequency band among the frequency bands which are extracted;
   previously store, in a storage portion, a first threshold and a second threshold;
   determine an existence of a knocking and determining whether a knock level of the knocking is a first knock level or a second knock level that is higher than the first knock level, by executing a first comparison operation to compare the time average value with the first threshold and a second comparison operation to compare the peak strength with the second threshold; and
   output a determination result to an ignition timing control portion and control a driving of an igniter, after determining the existence of the knocking and determining whether the knock level is the first knock level or the second knock level.

2. The engine control unit according to claim 1, wherein the at least one microcomputer is further configured to
   when the time average value is determined to be less than the first threshold, determine that the knocking does not exist,
   when the time average value is determined to be greater than or equal to the first threshold, determine that the knocking exists,
   when the knocking is determined to exist, execute the second comparison operation after executing the first comparison operation,
   when the peak strength is determined to be less than the second threshold, determine that the knock level is the first knock level, and when the peak strength is determined to be greater than or equal to the second threshold, determine that the knock level is the second knock level.

3. The engine control unit according to claim 1, wherein the at least one microcomputer is further configured to
when the peak strength is determined to be greater than or equal to the second threshold, determine that the knock level is the second knock level,
when the peak strength is determined to be less than the second threshold, execute the first comparison operation after executing the second comparison,
when the time average value is determined to be less than the first threshold, determine that the knocking does not exist, and
when the time average value is determined to be greater than or equal to the first threshold, determine that the knock level is the first knock level.

4. The engine control unit according to claim 1, wherein the at least one microcomputer is further configured to
extract, by a plurality of band-pass filters, the vibration components of the frequency bands, respectively,
each of the band-pass filters extracts the frequency band based on the resonant frequency set according to a formula that $f = \rho_{m,n} \times c / (\pi \times B)$, wherein the resonant frequency is expressed as f, a vibration mode constant is expressed as $\rho_{m,n}$, a sound velocity is expressed as c, and a cylinder bore diameter of the engine is expressed as B.

5. The engine control unit according to claim 1, wherein the at least one microcomputer is further configured to
extract the vibration component of the frequency band including the resonant frequency of when the vibration mode is a (1, 0) mode and the vibration component of the frequency band including the resonant frequency of when the vibration mode is a (2, 0) mode.

6. The engine control unit according to claim 1, wherein the second knock level has a higher peak strength of vibration than the first knock level.

7. An engine system, comprising:
an engine including a plurality of cylinders and an engine block;
an igniter disposed in a corresponding one of the plurality of cylinders;
a knock sensor disposed in the engine block and configured to detect knocking in the engine; and
an engine control unit coupled to the igniter and the knock sensor, the engine control unit including:
at least one memory; and
at least one microcomputer coupled to the at least one memory and configured to
acquire a sound or vibration of the engine from external, the at least one microcomputer extracts vibration components of a plurality of frequency bands, each of the frequency bands including a resonant frequency of a vibration mode among resonant frequencies of plural vibration modes;
synthesize the vibration components of the frequency bands which are extracted to generate a synthesis vibration waveform;
calculate a time average value by executing a time average operation to average the synthesis vibration waveform in a predetermined time;
detect a peak strength of the vibration component of the frequency band including a lowest resonant frequency, wherein the frequency band including the lowest resonant frequency is a frequency band among the frequency bands which are extracted;
previously store, in a storage portion, a first threshold and a second threshold;
determine an existence of a knocking and determining whether a knock level of the knocking is a first knock level or a second knock level that is higher than the first knock level, by executing a first comparison operation to compare the time average value with the first threshold and a second comparison operation to compare the peak strength with the second threshold; and
output a determination result to an ignition timing control portion and control a driving of the igniter, after determining the existence of the knocking and determining whether the knock level is the first knock level or the second knock level.

8. The engine system according to claim 7, wherein the at least one microcomputer is further configured to
when the time average value is determined to be less than the first threshold, determine that the knocking does not exist,
when the time average value is determined to be greater than or equal to the first threshold, determine that the knocking exists,
when the knocking is determined to exist, execute the second comparison operation after executing the first comparison operation,
when the peak strength is determined to be less than the second threshold, determine that the knock level is the first knock level, and
when the peak strength is determined to be greater than or equal to the second threshold, determine that the knock level is the second knock level.

9. The engine system according to claim 7, wherein the at least one microcomputer is further configured to
when the peak strength is determined to be greater than or equal to the second threshold, determine that the knock level is the second knock level,
when the peak strength is determined to be less than the second threshold, execute the first comparison operation after executing the second comparison,
when the time average value is determined to be less than the first threshold, determine that the knocking does not exist, and
when the time average value is determined to be greater than or equal to the first threshold, determine that the knock level is the first knock level.

10. The engine system according to claim 7, wherein the at least one microcomputer is further configured to
extract, by a plurality of band-pass filters, the vibration components of the frequency bands, respectively,
each of the band-pass filters extracts the frequency band based on the resonant frequency set according to a formula that $f = \rho_{m,n} \times c / (\pi \times B)$, wherein the resonant frequency is expressed as f, a vibration mode constant is expressed as $\rho_{m,n}$, a sound velocity is expressed as c, and a cylinder bore diameter of the engine is expressed as B.

11. The engine system according to claim 7, wherein the at least one microcomputer is further configured to
extract the vibration component of the frequency band including the resonant frequency of when the vibration mode is a (1, 0) mode and the vibration component of the frequency band including the resonant frequency of when the vibration mode is a (2, 0) mode.

12. The engine system according to claim 7, wherein the second knock level has a higher peak strength of vibration than the first knock level.

\* \* \* \* \*